A. & N. KANE.
HARROW.

No. 92,614.          Patented July 13, 1869.

Witnesses:
Chas. C. Wilson
Edmund Masson

Inventor:
A. & N. Kane.
By atty A. B. Stoughton.

United States Patent Office.

ALBERT KANE AND NELSON KANE, OF NEWPORT, NEW YORK.

Letters Patent No. 92,614, dated July 13, 1869.

IMPROVEMENT IN HARROWS.

The Schedule referred to in these Letters Patent and making part of the same.

*To all whom it may concern:*

Be it known that we, ALBERT KANE and NELSON KANE, of Newport, in the county of Herkimer, and State of New York, have invented certain new and useful Improvements in Harrows; and we do hereby declare the following to be a full, clear, and exact description of the construction and operation of the same, reference being had to the accompanying drawings, making a part of this specification, in which—

Similar letters of reference, where they occur in the several separate figures, denote like parts of the harrow in all of the drawings.

Figure 1:
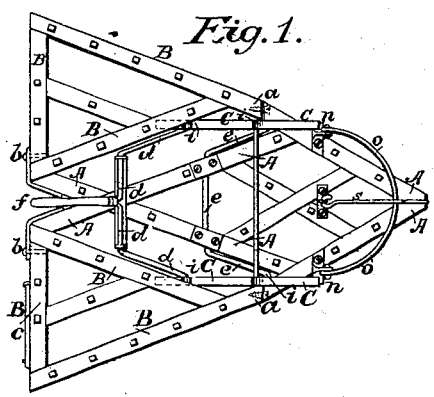
Figure 1 represents a top plan of the harrow, as it appears when arranged for work in the field.
Figure 2:
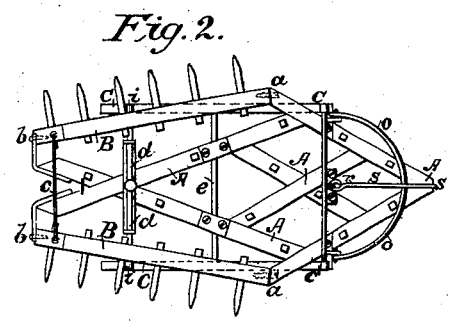
Figure 2 represents a top plan of the harrow, as it appears when folded up and arranged for transportation.
Figure 3:
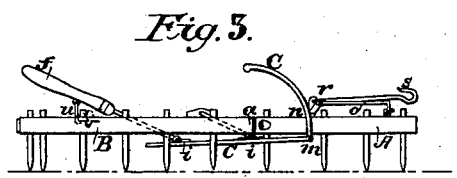
Figure 3 represents a side elevation of the harrow, as it appears when spread out and ready for work.

We are aware that fold-up harrows are quite common, and that runners have been used in connection with harrows, on which they have been transported. Of course, we lay no claim to such things, irrespective of our plan of constructing, arranging, and combining the several parts of the harrow, to effect the purposes hereinafter more fully set forth.

Our invention consists, first, in a harrow with runners, so hinged to it that when it is to be conveyed to and from the place where it is to be used, the runners can be lowered to the ground, and, at the same time, and by the same operation, the harrow is raised, and when the harrow is to be used, said runners can be raised, and, at the same time, and by the same mechanism and operation, the harrow can be lowered to the ground.

Our invention further consists in the use of runners, having hinges in them, in combination with guides that deflect the front or curved parts of the runners away from the front of the harrow as the runners are raised.

Our invention further consists in combining, with the hinged runners, and the teeth or harrow-frame, the crank-rods, and lever, for swinging or moving one upon the other, as the case may be.

Our invention further consists in combining, with the lever and crank-rods or axles, the catch for holding the runners in their raised position.

Our invention further consists in the combined use of the drag-bar, circular rail, and mechanism for adjusting the same.

To enable others skilled in the art to make and use our invention, we will proceed to describe the same, with reference to the drawings.

The harrow-frame is represented as composed of three sections, viz, a main central section A, and two side or wing-sections B B, the latter being hinged to the former at the points *a b*, respectively, so that they may turn or fold up, on said pivots or hinges, toward the central frame, and when so folded, they are held up by a link or hook, *c*, fastened to one and catching into the other.

When these two sections are let down and used for harrowing the soil, they are capable of yielding to the surface of the ground over which they pass, and thus conform to its inequalities.

On the central frame A are two crank-rods or axles *d e*, so connected therewith as that they may turn or be turned in their supports or bearings, by the operator seizing and manipulating a hand-lever, *f*, connected to one of said crank rods or axles.

The crank-rods or axles *d e* are at their lower ends connected, by hinged or yielding connections at *i i*, &c., to the runners C, and these runners have joints or hinges in them, at *m*, so that they may hinge or yield at said joints when raised up to be carried on the harrow-frame, or when let down to make them carry the frame, the bent portions of said runners moving through slotted guides *n n*, or their equivalents, on the harrow-frame, which turn them backward from the front of the harrow.

At or near the front of the main harrow-frame is arranged a hinged circular rail, *o*, which can be raised or lowered at its extreme front, for regulating the depth that the harrow-teeth may enter the ground, said adjustment being dependent on the draught of the team, to an extent; and at *r* there is hinged a drag-bar, *s*, which lies or moves on top of the rail *o*, and held thereto by an arm, *t*, upon it, which takes under said rail, so that while the drag-bar may sweep around upon the rail, it cannot leave it or rise from it.

On the lever *f* there is a hook, *u*, which, when the runners C are raised up and carried on the harrow-frame, takes under a catch, *v*, and so holds the lever and runners.

Figure 4:
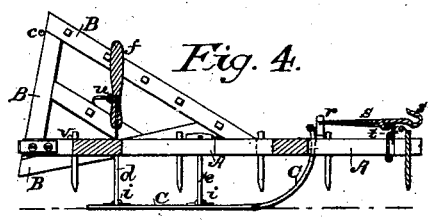
Figure 4 represents a side elevation, in section, of the harrow, as it appears when folded up and ready for transportation.

When the runners are thrown down, as in fig. 4, and the harrow-frame is supported by and carried on them, there is no necessity of having any catch or fastening, as the tendency of the load or draught of the team is to keep the runners in the position in which they are shown in said fig. 4.

It will be perceived that one operation of the lever *f*, as the case may be, lowers the runners and raises the harrow-frame, or lowers the harrow-frame and raises the runners, so that one shall ride on or be carried by the other.

We do not limit this application of movable and hinged runners to jointed or fold-up harrows only, for the hinged section may be taken off from our harrow, without disturbing the runners or their action with the main harrow-frame, though we prefer the hinged or fold-up frames, as they are convenient and useful.

Having thus fully described our invention,

What we claim therein as new, and desire to secure by Letters Patent, is—

1. In combination with a harrow-frame, the runners, so hinged to it that when it is to be conveyed to or from the place where it is to be used, said runners can be lowered to the ground, and, at the same time, and by the same mechanism and operation, the harrow is raised; and when the harrow is to be used, said runners can be raised and the harrow lowered, by the same mechanism and operation, substantially as herein described and represented.

2. Also, in combination with the harrow-frame and the runners, the hinges in the runners, and the guides on the frame, so that the front or curved parts of the runners shall be turned backward from the front of the harrow when they are raised, substantially as described.

3. Also, in combination with the frame and runners, the crank-rods or axles, and the lever, for raising or lowering one upon the other, substantially as described.

4. Also, in combination with the lever and crank-rods, for raising or lowering one part upon the other, the hook and catch, or their equivalents, for holding the runners up upon the frame, substantially as described.

5. Also, the combination of drag-bar and rail with the mechanism by which they are made adjustable, substantially as described.

N. KANE.
ALBERT KANE.

Witnesses:
J. G. BARRY,
MILTON HOWE,
J. A. STEWART,
C. S. RIDGWAY.